Figures 1, 2:
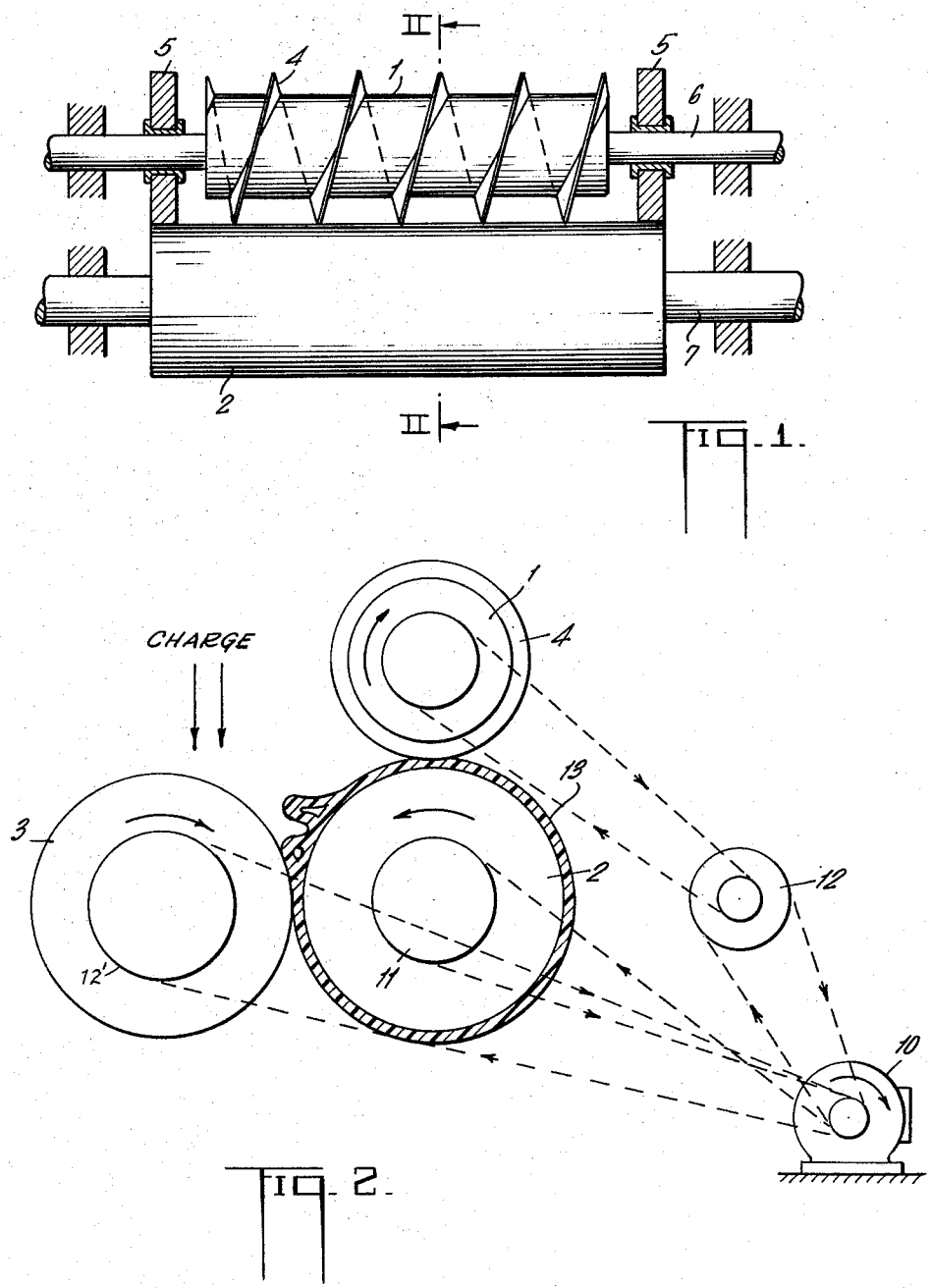

Nov. 1, 1960  I. CURLETTI  2,958,094
APPARATUS FOR CONTINUOUS CALENDERING OF
RESINOUS MATERIALS, PARTICULARLY
SYNTHETIC THERMOSETTING RESINS
Filed April 2, 1958  2 Sheets-Sheet 1

United States Patent Office 2,958,094
Patented Nov. 1, 1960

2,958,094

APPARATUS FOR CONTINUOUS CALENDERING OF RESINOUS MATERIALS, PARTICULARLY SYNTHETIC THERMOSETTING RESINS

Italo Curletti, Milan, Italy, assignor to Montecatini, Societa Generale per l'Industria Mineraria e Chimica, a corporation of Italy Filed Apr. 2, 1958, Ser. No. 725,891

6 Claims. (Cl. 18—2)

The present invention relates to apparatus for calendering resinous materials, particularly synthetic thermosetting resins.

The mixing of resins in general and of moulding powders in particular is generally carried out batch-wise by means of calenders or mixers provided with shaped rollers.

However, with batch-wise mixing, because of the intervals of idle working, the work-time ratio is too high.

Continuous calendering methods have been proposed, in which the starting mixture, in the form of a powder, is fed to a pair of heated rollers at the center of the nip formed between them, and the product, which is pushed from the center towards the ends of the driving roller of the pair, is continuously removed.

With such methods, so-called ploughs or knives are mounted along an axis over that of the roller to which the material adheres in order to improve the degree of mixing. However, the duration of mixing cannot be controlled with such devices. Moreover, the product removed at the ends of the driving roller is often heterogeneous and contains a portion of materials which are not sufficiently mixed, thus resulting in variation in the properties of the product. This is mainly due to the fact that the material is not turned over a sufficient number of times. Therefore the perfect homogeneity of the product, which is necessary in order to obtain successive quick transformation of the product into bodies of various kinds by application of heat and pressure, cannot be obtained.

The present invention provides apparatus for calendering synthetic resinous material comprising a pair of calendering rollers rotatable at different speeds and in opposite directions, and a third roller mounted above the faster of the two calendering rollers with its axis parallel to the axis of said faster roller for rotation in the opposite direction thereto, the surface of said third roller being provided with projections in the form of a helicoidal spiral, the edges of which abut the surface of said faster calendering roller, material being fed into the nip formed between said pair of rollers.

During operation the sheet of resinous material formed on the faster roller is cut by the edges of the projections and simultaneously turned over whilst being moved along the roller. As will be appreciated, the number of times that the sheet is turned over during movement along the roller is dependent on the speed of rotation of the faster calendering roller and the pitch of the helicoidal spiral. Thus, since it is possible to provide a spiral having a large number of spirals, perfect mixing and a better homogeneity of the product can be obtained.

Means may be provided for varying the distance between said faster calendering roller and said third roller.

Preferably said third roller is rotatable at a speed faster than that of said faster calendering roller.

In the simplest form of the invention said projections may be in the form of a single continuous helicoidal spiral, material being fed in at one end of the nip and discharged at the other end.

In an alternative form said projections may be formed by two, oppositely disposed helicoidal spirals, the arrangement being such that material fed in at the center of the nip is discharged at the ends thereof.

In yet a further alternative form, said projections may be formed by two oppositely disposed helicoidal spirals, the arrangement being such that material fed in at the two ends of the nip is discharged centrally thereof.

The following is a description, by way of example, of three embodiments of the invention. Reference is made to the accompanying drawings in which—

Figure 3:
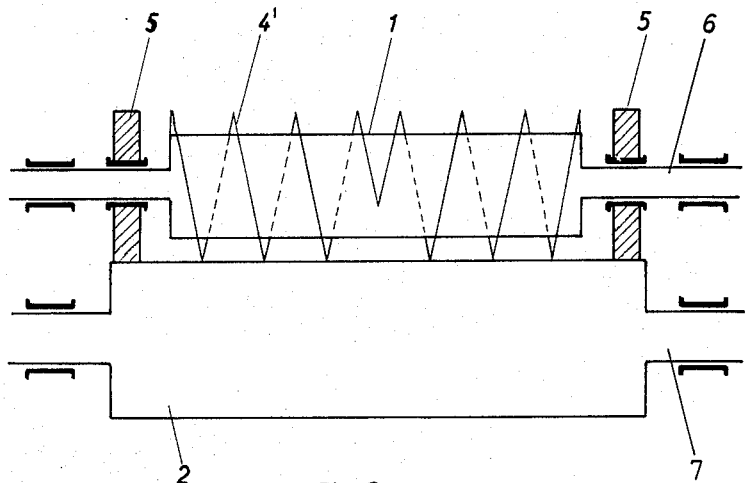
Figure 4:
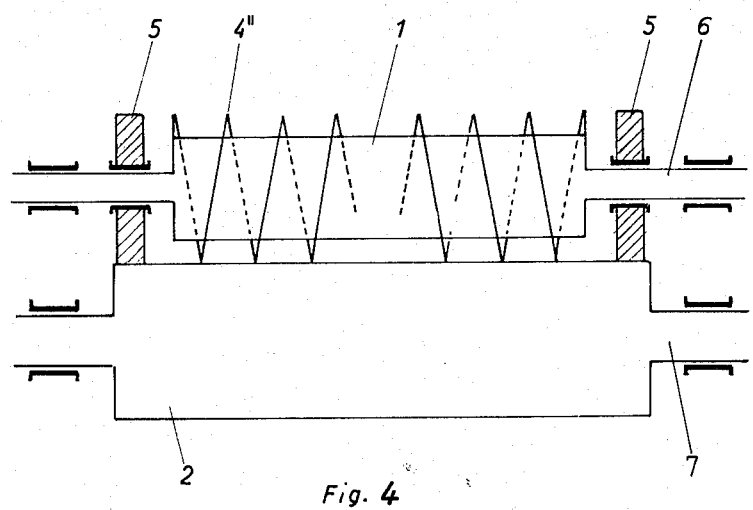

Fig. 1 is a diagrammatic longitudinal section of calendering apparatus in accordance with the invention, Fig .2 is a section on the line II—II of Fig. 1, Fig. 3 is a diagrammatic longitudinal section of an alternative form of calendering apparatus, and Fig. 4 is a diagrammatic section of yet another form of the invention.

Referring first to Figs. 1 and 2, the apparatus consists of a pair of heated calendering rollers 2 and 3, roller 2 being rotatable at a faster speed than roller 3. A third roller 1 is mounted above the roller 2 with its axial shaft 6 parallel to the axial shaft 7 of the roller 2.

On the surface of the roller 1 there are provided one or more spiral-like projections 4, which are in the form of a screw thread.

Spacing devices or collars 5 are provided for varying the spacing of the roller 1 from roller 2 so that the cutting edges of the projections skim the surface of the roller 2, cutting deeply into the sheet of resinous material which is formed on the roller 2. To vary the setting, the devices 5 are replaced by others of smaller or larger outer diameter.

By a suitable speed variating means 12 (Fig. 2) a wide variation in speed can be imparted to the screw spiral, which rotates in a direction opposite to that of the roller 2. All three rollers can be turned by motor 10. The higher speed of roller 2, as compared with roller 3, can be obtained in any convenient manner; for example, by employing a transmission means 11 having a smaller diameter than that shown at 12'.

The resinous sheet 13 formed on roller 2 is simultaneously cut by as many cutting edges as there are points of contact of the projections with the surface of the roller 2.

The speed of rotation of the spiral or spirals causes a lifting of the sheet and displacement of the product from one to the other end of the roller 2.

In this way, in addition to the displacement of the calendered sheet on the roller 2—the speed of this displacement being a function of the speed of rotation of the roller 1—a simultaneous turning over of the product to be calendered is obtained. This operation corresponds to the number of contact points or cuts of the projections, multiplied by the number of revolutions of the roller 2 occurring during the time required for calendering depending on the desired degree of plasticity.

This is illustrated by the following example which relates to a test conducted with a resinous material which required 3 minutes milling on a calender roller couple of average type (diameter 400 x 1000 mm.).

*Example*

Using apparatus in accordance with the present invention the number of contact points of the projections was 20, the roller 2 was rotated at 16 r.p.m. and processing time was 3 minutes.

The number of times the material is turned over is the product of these three figures i.e. 960 times during its passage along the whole length of the roller 2.

The directions of rotation of the three rollers are shown in Fig. 2.

From this description it is evident that apparatus constructed according to the present invention permits the regulation of the milling time, which is determined by the rotation speed of the roller 1. It will be seen also that a very high degree of mixing is obtained, and thus the homogeneity of the calendered product is greatly improved, in comparison with that obtained by use of known apparatus.

Since the degree of condensation of thermosetting resins is a function of temperature and time, the mixing process is subjected to certain limits. However, according to the present invention, with continuous working the calendering operation can be accelerated by increasing the sideward movement of the plastic mass on the roller 2, which can be heated to a higher temperature so that the product of the two factors, time and temperature, remains constant. Therefore, by decreasing the time as a result of the higher temperature of the roller, the product can be displaced at a higher rate, with a resulting increased output.

Referring now to Fig. 3, it has been found that in some cases and for mixing certain synthetic and natural plastic materials it is opportune to carry out the charging of the powders to be calendered at the center of the rollers, discharge taking place at the ends thereof.

To this end the spiral-like projections 4' are formed in two separate spirals which are symmetrical about the center line of the cylinder; they have equal pitches but are oppositely disposed. Thus material fed in at the center is transported sidewardly and discharged at the two ends of the rollers 2 and 3.

The embodiment illustrated by Fig. 4 differs from that illustrated in Fig. 3 solely in that the direction of the two parts of the spiral 4" are reversed.

With this apparatus the powder is fed at both ends of the rollers and the calendered product is discharged at the center.

I claim:

1. Apparatus for calendering thermosetting resinous material comprising a pair of substantially smooth surfaced heated calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of at least one helicoidal spiral, the edges of which abut the surface of said faster calendering roller, material being fed into the nip formed between said pair of rollers, the material being cut, turned over, and moved along the surface of the faster roller, by said edges.

2. Apparatus for mixing and calendering thermosetting resin forming powder material comprising a pair of substantially smooth calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of at least one helicoidal spiral, the edges of which extend at least closely to the surface of said faster calendering roller, material being fed into the nip formed between said pair of rollers, the sheet of resin material forming on the surface of the faster calendering roller being cut, turned over, and moved along the surface of the faster roller by said edges, means for rotating said third roller at a speed faster than that of said faster calendering roller.

3. Apparatus for calendering resinous material comprising a pair of substantially smooth calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of a single continuous helicoidal spiral, the edges of which abut the surface of said faster calendering roller, material being fed in at one end of the nip formed between said pair of rollers and discharged at the other end, the material being cut and turned over by said edges.

4. Apparatus for calendering resinous material comprising a pair of substantially smooth calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of helicoidal spirals, the edges of which extend at least closely to the surface of said faster calendering roller, material being fed into the nip formed between said pair of rollers, the sheet of resin material forming on the faster calendering roller being cut and turned over by said edges, said projections being formed by two oppositely disposed helicoidal spirals, the arrangement of the spirals being such that material fed in at the center of the nip is discharged at the opposite ends thereof.

5. Apparatus for calendering resinous material comprising a pair of substantially smooth calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of helicoidal spirals, the edges of which extend at least closely to the surface of said faster calendering roller, material being fed into the nip formed between said pair of rollers, the sheet of resin material forming on the faster calendering roller being cut and turned over by said edges, said projections being formed by two oppositely disposed helicoidal spirals, the arrangement of the spirals being such that material fed in at the two ends of the nip is discharged centrally thereof.

6. Apparatus for calendering resinous material comprising a pair of substantially smooth calendering rollers rotatable at different speeds and in opposite directions and a third roller mounted above the faster of the two calendering rollers with its axis parallel to the axis of said faster roller for rotation in the opposite direction thereto, the surface of said third roller being provided with projections in the form of a helicoidal spiral, the edges of which are directed toward the surface of said faster calendering roller, material being fed into the nip formed between said pair of rollers, the material being cut and turned over by said edges, variable speed means for rotating said third roller, including at a speed faster than that of said faster calendering roller.

References Cited in the file of this patent

UNITED STATES PATENTS

| 960,274 | Clark | June 7, 1910 |
| 1,850,450 | Denmire | Mar. 22, 1932 |
| 2,134,897 | Theiner | Nov. 1, 1938 |
| 2,273,206 | Kuhn | Feb. 17, 1942 |
| 2,534,291 | Moss | Dec. 19, 1950 |
| 2,571,760 | Rathbun | Oct. 16, 1951 |
| 2,838,790 | Hartman | June 17, 1958 |

FOREIGN PATENTS

| 876,911 | Germany | May 18, 1953 |

UNITED STATES PATENT OFFICE
CERTIFICATION OF CORRECTION

Patent No. 2,958,094                              November 1, 1960

Italo Curletti

It is hereby certified that error appears in the above numbered patent requiring correction and that the said Letters Patent should read as corrected below.

In the heading to the printed specification, between lines 8 and 9, insert -- Claims priority, application Italy April 4, 1957 --.

Signed and sealed this 9th day of May 1961.

(SEAL)
Attest:

ERNEST W. SWIDER                              DAVID L. LADD
Attesting Officer                             Commissioner of Patents